March 11, 1969  G. A. WOOD, JR  3,431,994
ELECTRIC DRIVE FOR BICYCLES
Filed June 13, 1967  Sheet 1 of 3

INVENTOR
Garfield A. Wood, Jr.

BY Lane, Aitken, Dunner & Ziems
ATTORNEYS

INVENTOR
Garfield A. Wood, Jr.

March 11, 1969  G. A. WOOD, JR  3,431,994
ELECTRIC DRIVE FOR BICYCLES
Filed June 13, 1967

INVENTOR
Garfield A. Wood, Jr.

BY
Lane, Aitken, Dunner & Ziems
ATTORNEYS

United States Patent Office 3,431,994
Patented Mar. 11, 1969

3,431,994
ELECTRIC DRIVE FOR BICYCLES
Garfield A. Wood, Jr., 4565 Sabal Palm Road,
Bay Point, Miami, Fla. 33137
Filed June 13, 1967, Ser. No. 645,703
U.S. Cl. 180—31
Int. Cl. B62k 11/10; B62d 3/00, 6/02
12 Claims

ABSTRACT OF THE DISCLOSURE

The specification and drawings disclose an electrically operated bicycle drive. The drive assembly generally includes a friction drive wheel adapted to frictionally engage a tire of the bicycle to drive the bicycle. The friction drive wheel is rotated by a plurality of small electric motors connected by a gear train to a gear on the friction drive wheel. The drive assembly is clamped over either the front or rear wheel of the bicycle by a clamp which engages either the front or rear forks of the bicycle. The friction drive wheel is spring biased against the tire in its driving position to minimize slippage.

Background of the invention

The present invention relates to a drive assembly for propelling bicycles, and more particularly to an electrically operated bicycle drive assembly.

Various types of motorized bicycles in which the bicycle is propelled by a motor-driven friction wheel engaged with a tire of the bicycle are well known in the art as represented by U.S. Patents 2,350,791, 2,409,887, 3,056,460 and 3,225,854. However, in the devices described by the aforesaid patents the motors are of the internal combustion type. These motors are quite heavy and bulky in relation to the amount of power they develop. Additionally, they generate considerable noise and often subject the operator of the vehicle to toxic exhaust fumes. With the current emphasis on the control of air pollution and on the use of motors which do not release toxic vapors, there is a need for a self-propelled bicycle which does not release toxic exhaust fumes.

Summary of the invention

It is accordingly one of the objects of the present invention to provide a bicycle drive assembly which is powered by electric motors.

It is a more specific object of the present invention to provide a bicycle drive assembly which is powered by a plurality of subfractional horsepower electric motors of the type used on many small toys.

It is a further object of the present invention to provide a bicycle drive assembly having a plurality of electric motors which propel the bicycle by the frictional engagement of a drive wheel with a tire of the bicycle.

Other objects and features of novelty of the invention will become apparent to one skilled in the art when referred to the following description, taken in conjunction with the accompanying drawings wherein:

Description of the preferred embodiments

Figure 1:
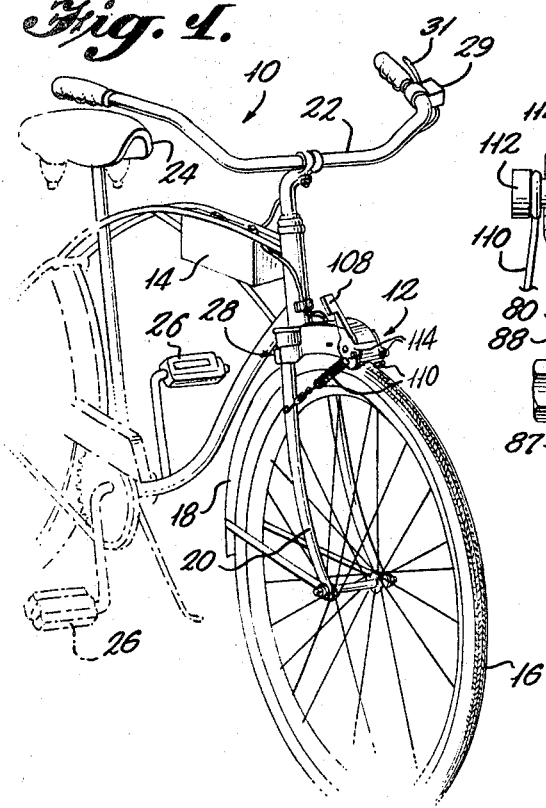
FIG. 1 is a perspective view of a bicycle equipped with the drive assembly of the present invention.

Referring initially to FIG. 1, there is disclosed a bicycle 10 which is provided with a conventional power supply 14 and a drive assembly 12 embodying features of the present invention.

The bicycle which can be employed in conjunction with the present invention may be any of a wide variety of domestic and foreign bicycles commercially available. The bicycle shown in FIG. 1 is equipped with the usual components such as a front wheel 16, a front fender 18, a front fork 20, handle bars 22, a seat 24 and peddles 26. In order to most conveniently mount the drive assembly 12 of the present invention, it is preferable that the portion of the front fender 18 extending beyond the fork 20 be removed so that it will not interfere with the drive assembly. Alternatively, the drive assembly 12 may be attached directly to the front fender extending beyond the fork 20 so long as the projection of the fender 18 does not interfere with the friction drive wheel, to be described hereinafter.

The drive assembly 12 of the present invention is positioned directly above the front wheel 16 and is attached to the upper portion of the fork 20 by means of a clamp 28. The electric motors contained within a casing 30 of the drive assembly 12 are connected in parallel with one another and are connected in series with the power supply 14 and a rheostat 29 by suitable electric wires. As shown in FIG. 1, the rheostat 29 is mounted on the handle bars in position to enable a lever 31 thereof to be actuated by the rider without removing his hand from the hand grip. The lever 31 is spring biased to automatically retract to the off position shown when released to deenergize the motors. As the lever 31 is moved toward the hand grip against the spring bias, the current supplied to the motors increases to increase the speed of the bicycle. The power supply 14 may be any of a wide variety of batteries having a direct current output and voltage of suitable magnitude for the motors of drive assembly 12. In the application shown, a small 12 volt battery of the type used in foreign cars is employed.

Figure 5:
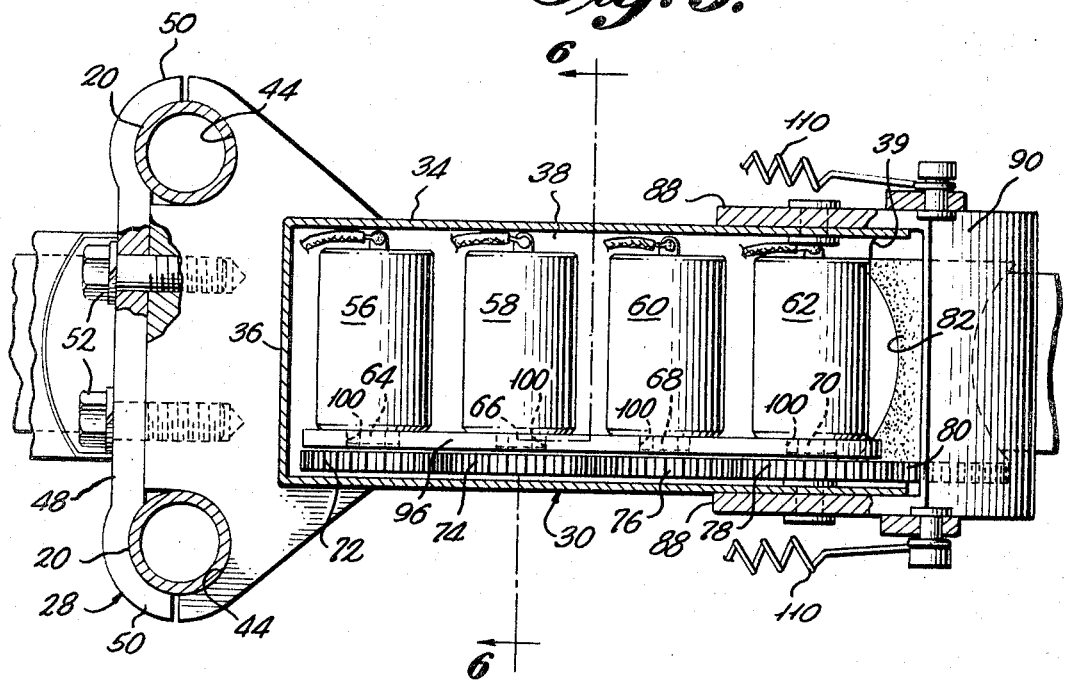
FIG. 5 is a sectional view taken along the lines 5—5 of FIG. 2.
Figure 6:
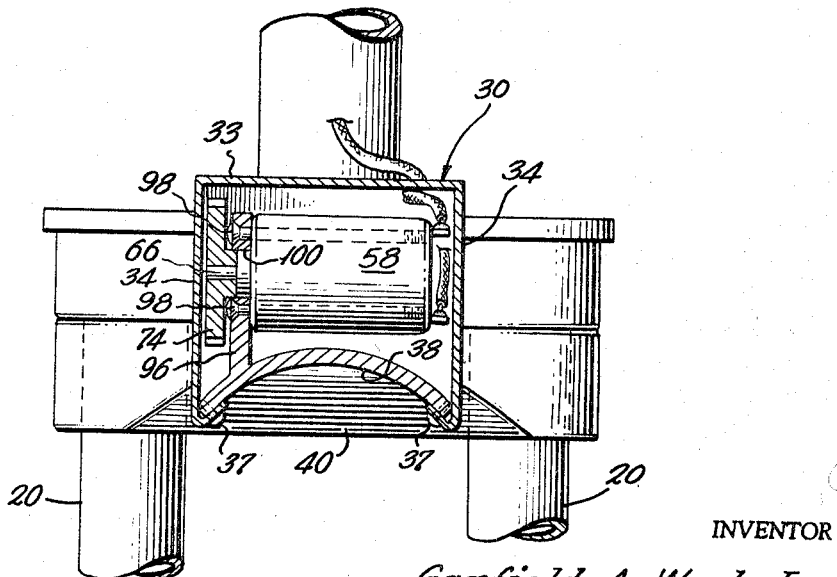
FIG. 6 is a sectional view taken along the lines 6—6 of FIG. 5.

Referring to FIGS. 5 and 6, the casing 30 includes a top wall 33, side walls 34 and an end wall 36 mounted upon a curved bottom plate 38 by screws 37. The bottom plate 38 terminates at 39 so as not to interfere with the movement of the friction drive wheel 82 to be described hereinafter. The bottom plate 38 is curved to conform generally to the surface of tire 16 which it overlies.

A flange 40 is formed as an integral part of the bottom plate 38 and forms part of the clamp 28. The flange 40 is provided with a pair of spaced curved recesses 44 which mate with the forks 20. The complementary portion of clamp 28 is provided by a clamp element 48 having curved ends 50 which mate with the forks 20. The clamp element 48 is fastened to the flange 40 by bolts 52.

Figure 2:
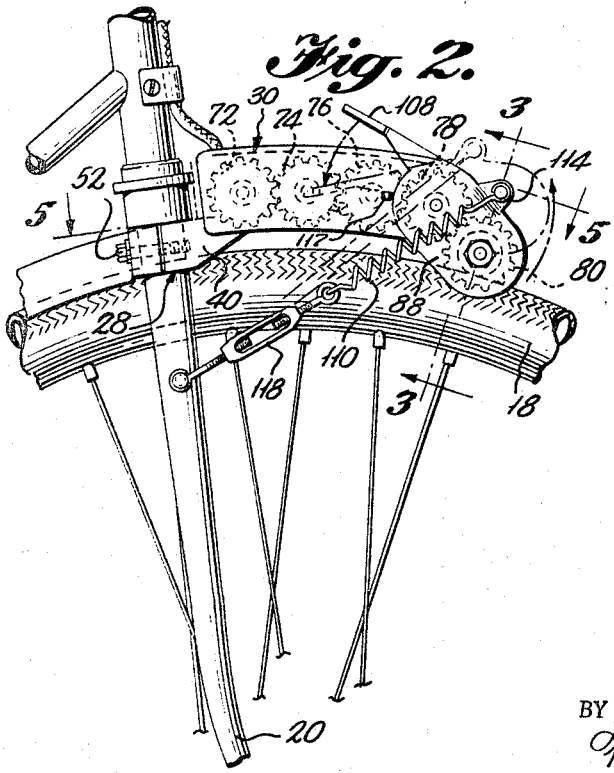
FIG. 2 is a side view of the drive assembly of FIG. 1.

Referring to FIG. 2, as well as FIGS. 5 and 6, a plurality of electric motors 56, 58, 60 and 62 are mounted within the casing 30. While four motors have been shown it is to be understood that any plurality of motors may be employed. Any of a wide variety of small electric motors may be employed in the present invention. It has been found most practical to employ subfractional horsepower motors of the permanent magnet type used in many toys. Fractional horsepower motors are less than one horsepower and most commonly are ¾ and ½ horsepower motors. Subfractional horsepower motors are hereby defined as motors having ⅓ horsepower or less.

Each of the motors is mounted on a vertical web 96 projecting from the bottom plate 38 by a pair of bolts 98. The motors have output shafts 64, 66, 68 and 70 projecting from bosses 65, 67, 69 and 71 of the motors. The bosses fit in and center the motors with respect to holes 100 in the vertical web 96. Pinion gears 72, 74, 76 and 78 respectively, are mounted on the output shafts and mesh with one another to form a continuous gear train. The last gear 78 meshes with a gear 80 fixed to the friction drive wheel 82. Thus, when the electric motors are energized, each of them transmits a driving torque through the gear train to drive the friction wheel 82. The friction wheel 82 in turn drives the wheel of the bicycle 16. As stated above, the motors 56–62 are connected in parallel with one another so that the 12 volt battery voltage is applied to each of the motors. The electric connections to each of the motors is made so that the motors 56 and 60 are energized to rotate in a counterclockwise direction, and the motors 58 and 62 are energized to rotate in a clockwise direction. This rotates the gear 80 and the friction wheel 82 in a counterclockwise direction to drive the bicycle wheel 16 in a clockwise direction and thus propel the bicycle in a forward direction.

Figure 3:
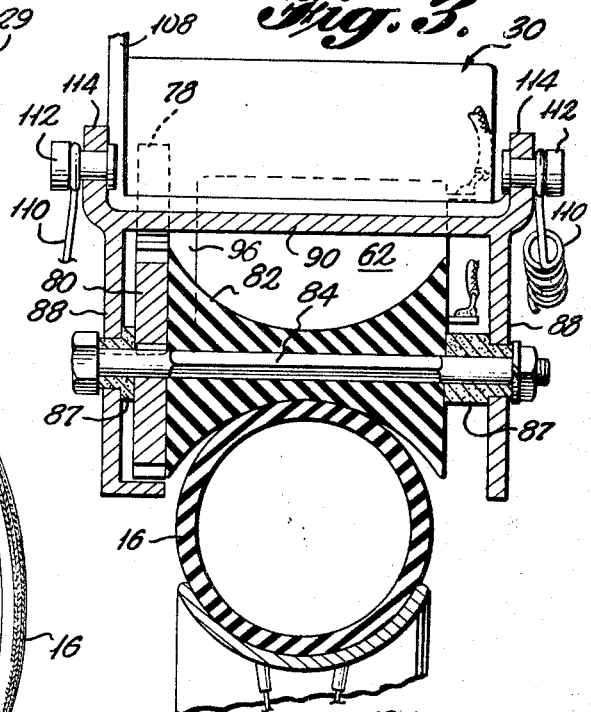
FIG. 3 is a sectional view taken along the lines 3—3 of FIG. 2.

The friction drive wheel 82 is shown as having a concave configuration substantially corresponding to the curvature of tire 16 to increase the area of frictional engagement. As best seen in FIG. 3, the friction wheel is fixed upon a shaft 84 rotatably journaled in side plates 88 by flanged bushings 87. The side plates 88 are connected by a top plate 90 in a manner to generally enclose the friction wheel 82.

The side plates 88 overlap the side walls 34 of the casing 30 and are pivotally connected to the side walls 34 by rivets, or the like, for pivotal movement about the axis of the gear 78. The side plates 88 are also provided with projecting lugs 114 to which springs 110 are fastened by a bolt 112. The other ends of the springs 110 are connected to the fork 20 as at 116 by a turnbuckle 118 as best seen in FIG. 2.

Affixed to the side plates 88 as an integral part thereof is a lever 108. Pushing down on the lever 108 causes side plates 88 to pivot in a counterclockwise direction as viewed in FIG. 2 about the axis of the gear 78 to retract the friction wheel 82 from engagement with tire 16. During this retracting movement the friction wheel gear 80 orbits about the gear 78 of the motor 62 without interrupting its driving engagement therewith. The position to which side plates 88 and actuating lever 108 can be retracted is shown in phantom in FIG. 2.

In the operating position, the friction wheel 82 is biased against tire 16 by the spring 110 as shown in solid lines in FIG. 2. The spring 110 is anchored to the fork 20 by the turnbuckle 118 as previously described to facilitate adjustment of the tension on spring 110. When the lever 108 is depressed to its disengaged position, the lugs 114 are moved overcenter so that the tension of the spring maintains the lugs 114, and hence side plates 88, in the disengaged position shown in phantom lines in FIG. 2. Thus, the friction drive wheel may be biased against the tire 16 by the spring 110 in one position and may be biased away from the tire 16 by the spring 110 after the lever 108 has been depressed overcenter. A stop 117 is provided on the side wall 34 in position to engage the lever 108 to prevent movement of lever 108 beyond the disengaged position shown in phantom.

Figure 4:
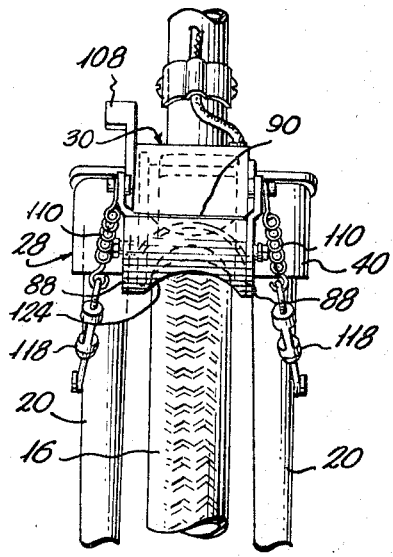
FIG. 4 is a front view of the drive assembly of FIG. 2.

FIG. 4 illustrates a front view of the drive assembly of the present invention in operating position. As can be seen from this figure, the top plate 90 interconnecting the side plates 88 curves downwardly to enclose the front end of the assembly to exclude dirt and other debris. The forward edge of the top plate 90 is provided with a curved recess 121 to conform to the curvature of the tire 16.

Figure 7:
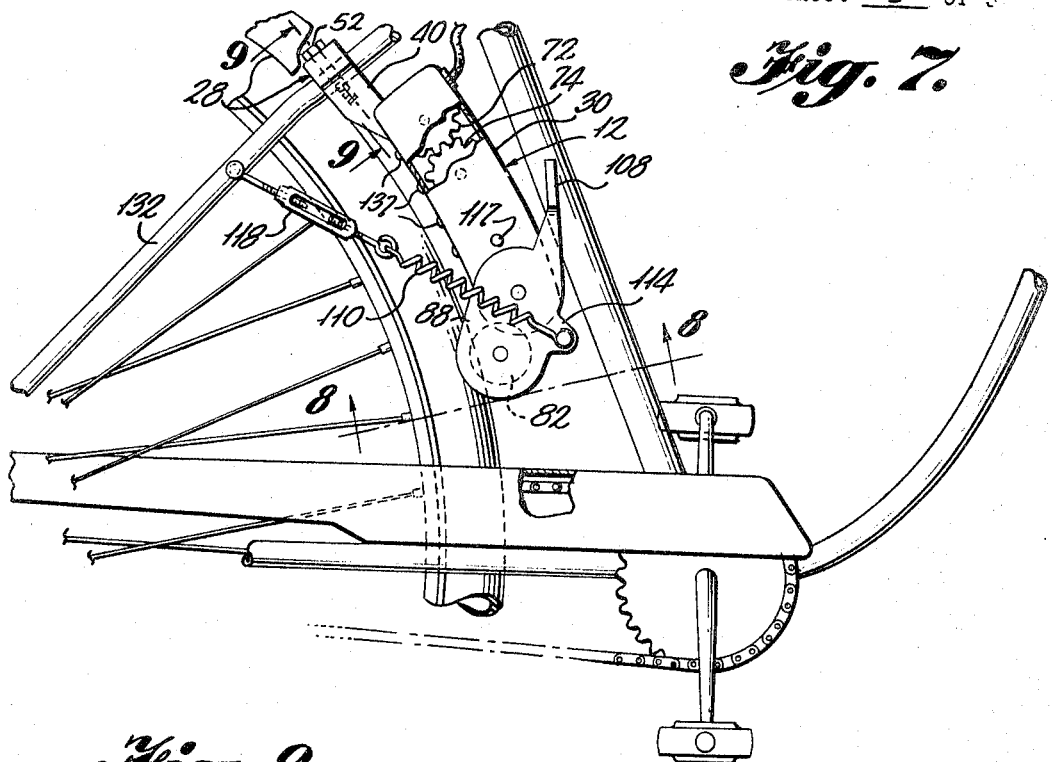
FIG. 7 illustrates another embodiment of the present invention wherein the novel drive assembly is mounted on the rear wheel of the bicycle.
Figure 8:
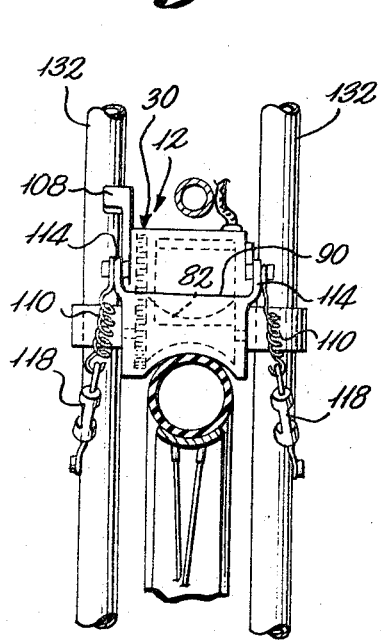
FIG. 8 is a sectional view taken along the lines 8—8 of FIG. 7 and,
FIG. 9 is a sectional view taken along the lines 9—9 of FIG. 7.
Figure 9:
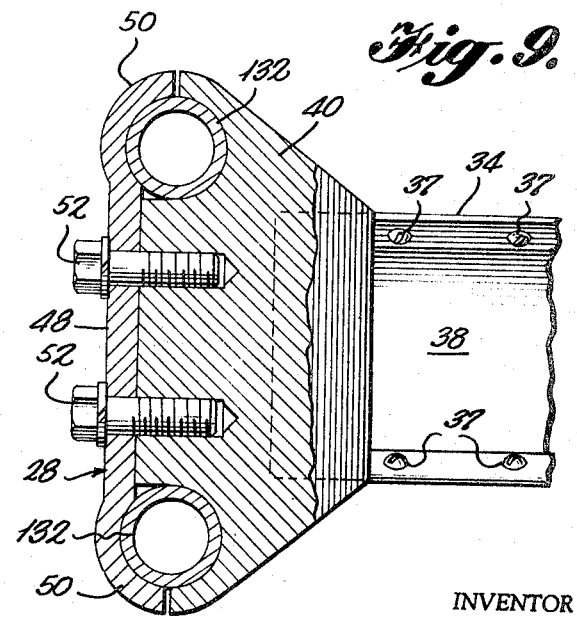

Referring to FIGS. 7–9, the drive assembly 12 is illustrated mounted over the rear wheel of the bicycle. It is clamped to the rear wheel forks 132 by the clamp 28. The friction drive wheel 82 may be engaged or disengaged from rear tire 140 by actuating the lever 108 in the same manner as discussed above. The turnbuckles 118 are anchored to the rear wheel forks 132 with the springs 110 connected between the turnbuckles and the lugs 114 as previously described.

In view of the foregoing description, it is evident that the drive assembly of the present invention provides a quiet, simple and economical means for driving a bicycle. Speeds of up to 40 miles an hour may be achieved by utilizing four or more electric motors as discussed above, although fewer electric motors may be used if desired. The speed achieved, of course, will be in part determined by the ratio of diameters of the friction drive wheel to the diameter of the tire of the bicycle as is well known to those skilled in the art.

While it will be apparent that the embodiments of the invention herein disclosed are well calculated to fulfill the objects of the invention, it will be appreciated that the invention is susceptible to modification, variation and change. For example, the friction drive wheel could be fixed against pivotal movement relative to the casing 30 and the casing 30 and the entire drive assembly 12 could be pivotally connected to the front fork 20 to enable the friction wheel to be moved in and out of engagement with the front tire. If this is done compression springs can be provided between the handle bars and the casing 30 to spring bias the friction drive wheel against the tire. A suitable latch could also be provided to latch the drive assembly in a retracted position.

What is claimed is:
1. In combination with a cycle having a DC power supply and at least two wheels, a drive assembly electrically connected to said power supply and mounted adjacent to one of said wheels, said drive assembly comprising a plurality of DC subfractional horsepower permanent magnet motors, a friction drive wheel adapted to be frictionally engaged with said one wheel, a drive gear drivingly connected to said friction drive wheel, and gear means drivingly connecting said motors to said gear, said gear means including a gear drivingly connected to the output shaft of each of said motors.

2. The invention as defined in claim 1 wherein said motor gears mesh with one another in a manner to form an elongated gear train, said drive gear being meshed with a motor gear on one end of said gear train.

3. The invention as defined in claim 2 including means for mounting said drive gear and said friction drive wheel for movement between advanced and retracted positions while maintaining said drive wheel gear meshed with said gear train, said friction drive wheel frictionally engaging said one wheel in said advanced position and being disengaged from said one wheel in said retracted position.

4. An electric motor drive assembly comprising support means, a friction drive wheel rotatably mounted on said support means and adapted to be frictionally engaged with a wheel, a plurality of DC subfractional horsepower permanent magnet electric motors mounted on said support means, a drive gear drivingly connected to said friction drive wheel, and gear means drivingly connecting said motors to said drive gear, said gear means including a gear drivingly connected to the output shaft of each of said motors, said motor gears forming an elongated gear train, and said drive gear being meshed with a motor gear on one end of said gear train.

5. The invention as defined in claim 4 including means for mounting said drive gear and friction drive wheel for movement between advanced and retracted positions while maintaining said drive gear meshed with said gear train whereby said friction drive wheel may be moved into and out of frictional engagement with said wheel.

6. An electric motor drive assembly comprising support means, a friction drive wheel rotatably mounted on said support means and adapted to be frictionally engaged with a wheel, a plurality of DC subfractional horsepower electric motors mounted on said support means, and drive means for drivingly connecting said motors to said friction drive wheel, said support means having clamping means thereon for mounting said drive assembly on the wheel forks of a bicycle.

7. An electric motor drive assembly comprising support means, a friction drive wheel rotatably mounted on said support means and adapted to be frictionally engaged with a wheel, a plurality of DC subfractional horsepower electric motors mounted on said support means, drive means for drivingly connecting said motors to said friction drive wheel, said support means including a wall having a flat surface, means for mounting said motors on said surface with the output shafts thereof perpendicular to said surface, and wherein said friction drive wheel is mounted for rotation about an axis parallel to said output shafts.

8. The invention as defined in claim 7 wherein said output shafts project through said wall and said drive means connects the projecting ends of the output shafts to said friction drive wheel.

9. An electric motor drive assembly comprising support means, a friction drive wheel rotatably mounted on said support means and adapted to be frictionally engaged with a wheel, a plurality of DC subfractional horsepower electric motors mounted on said support means, and drive means for drivingly connecting said motors to said friction drive wheel, said motors and friction drive wheel being mounted in position to form a train with the axes of the motors and friction drive wheel parallel to one another.

10. In combination, a cycle having a pedal chain drive drivingly connected to a rear wheel thereof, a DC power supply mounted on said cycle, and a drive assembly electrically connected to said power supply and mounted on said cycle, said drive assembly comprising a plurality of DC subfractional horsepower permanent magnet motors, a rotatable output drive member, and gear means drivingly connecting said motors to said output drive member, and means drivingly connecting said output drive member directly to the front wheel of said cycle.

11. The invention as defined in claim 10 wherein said output drive member comprises a friction drive wheel adapted to be frictonally engaged with said one wheel.

12. The invention as defined in claim 11 including means for moving said friction drive wheel to a position out of engagement with said front wheel.

References Cited
UNITED STATES PATENTS

| | | | |
|---|---|---|---|
| 596,273 | 12/1897 | Libbey | 180—34 |
| 596,274 | 12/1897 | Libbey | 180—34 |
| 627,066 | 6/1899 | Schnepf | 180—34 |
| 2,463,349 | 3/1949 | Baner | 310—112 |
| 2,491,076 | 12/1949 | Benazzoli | 180—33 |
| 2,920,845 | 12/1960 | Palmiter | 180—74 X |
| 2,990,026 | 6/1961 | Albee | 180—74 |
| 3,075,599 | 1/1963 | Yadon et al. | 180—74 X |
| 3,361,917 | 1/1968 | Stahly | 310—154 |

KENNETH H. BETTS, *Primary Examiner.*

U.S. Cl. X.R.

180—65, 74; 310—112, 152